(12) United States Patent
Sugiyama (10) Patent No.: US 11,048,216 B2
(45) Date of Patent: Jun. 29, 2021

(54) CONTROL DEVICE

(71) Applicant: FANUC CORPORATION, Yamanashi (JP)

(72) Inventor: Yuusuke Sugiyama, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 157 days.

(21) Appl. No.: 16/119,131

(22) Filed: Aug. 31, 2018

(65) Prior Publication Data

US 2019/0072915 A1  Mar. 7, 2019

(30) Foreign Application Priority Data

Sep. 5, 2017 (JP) .............................. JP2017-170626

(51) Int. Cl.
| | | |
|---|---|---|
| G05B 13/02 | (2006.01) | |
| G06N 20/00 | (2019.01) | |
| G06F 1/28 | (2006.01) | |
| G06F 17/18 | (2006.01) | |

(52) U.S. Cl.
CPC ............. G05B 13/029 (2013.01); G06F 1/28 (2013.01); G06N 20/00 (2019.01); *G05B 2219/34315* (2013.01); *G06F 17/18* (2013.01)

(58) Field of Classification Search
None
See application file for complete search history.

(56) References Cited

U.S. PATENT DOCUMENTS

| 8,924,352 B1 | 12/2014 | Andruss et al. |
| 2016/0005245 A1 | 1/2016 | Murakami |
| 2016/0232456 A1 * | 8/2016 | Jain ...................... G06N 20/00 |
| 2017/0213457 A1 | 7/2017 | Sato |
| 2017/0243135 A1 | 8/2017 | Ooba et al. |
| 2017/0274467 A1 * | 9/2017 | Rajagopalan ........ B23K 9/0953 |

(Continued)

FOREIGN PATENT DOCUMENTS

| CN | 101782976 A | 7/2010 |
| CN | 102163073 A | 8/2011 |

(Continued)

OTHER PUBLICATIONS

Oliver, E. et al., "An empirical approach to smartphone energy level prediction," Proc. of the 13th Intl. Conf. on Ubiquitous Computing (2011) pp. 345-354. (Year: 2011).*

(Continued)

*Primary Examiner* — Brian M Smith
(74) *Attorney, Agent, or Firm* — RatnerPrestia (57) ABSTRACT

A control device which predicts the timing of disconnection of a power supply is provided with a machine learning device configured to learn the disconnection timing of the power supply. The machine learning device is provided with a state observation unit configured to observe an operation content for the control device for each user as one of state variables representative of a present state of an environment, a determination data acquisition unit configured to acquire determination data which indicates that power disconnection of the control device is commanded by the user, and a learning unit configured to learn the operation content for each user and a command for the power disconnection in association with each other by using the state variable and the determination data.

7 Claims, 9 Drawing Sheets

(56) References Cited

U.S. PATENT DOCUMENTS

2017/0282275 A1* 10/2017 Nikou .................. H05H 1/36
2017/0330157 A1* 11/2017 Lamers ............... B23K 9/0953
2018/0015560 A1*  1/2018 Narayanan ............ B23K 26/38
2019/0022787 A1*  1/2019 Daniel ................ B23K 9/095

FOREIGN PATENT DOCUMENTS

| | | |
|---|---|---|
| CN | 102339118 A | 2/2012 |
| CN | 105318499 A | 2/2016 |
| CN | 106407048 A | 4/2017 |
| JP | H02253466 A | 10/1990 |
| JP | H07-28572 A | 1/1995 |
| JP | 2002351600 A | 12/2002 |
| JP | 2004152276 A | 5/2004 |
| JP | 2008195295 A | 8/2008 |
| JP | 2014159247 A | 9/2014 |
| JP | 2017033526 A | 2/2017 |
| JP | 2017146879 A | 8/2017 |
| WO | 2016013574 A1 | 1/2016 |

OTHER PUBLICATIONS

Decision to Grant a Patent for Japanese Application No. 2017-170626, dated Jul. 23, 2019, with translation, 5 pages.
Wan et al., "Prediction of Shutdown Behavior of Digital TV Users Based on Big Data", Video Engineering, 2016, vol. 40. No. 12, pp. 68-72.
Chinese Office Action for Chinese Application No. 201811032419.X, dated Apr. 22, 2020 with translation, 15 pages.

\* cited by examiner

CONTROL DEVICE

CROSS-REFERENCE TO RELATED APPLICATION

This application is a new U.S. Patent Application that claims benefit of Japanese Patent Application No, 2017-170626, filed Sep. 5, 2017, the disclosure of this application is being incorporated herein by reference in its entirety for all purposes.

BACKGROUND OF THE INVENTION

Field of the Invention

The present invention relates to a control device, and more particularly, to a control device capable of reducing the time required for power disconnection processing by predicting the timing of power disconnection by a user and previously carrying out data saving processing and the like before the predicted timing.

Description of the Related Art

A conventional control device performs processing (hibernation or backup data transfer) for saving data to be stored from a volatile memory into a non-volatile memory, in response to a command for power disconnection issued by a user, and disconnects the power supply after the execution of this processing. While this processing is essential to the reduction of the next start-up time of the control device, it has a problem that it is a long time from the issuance of the power disconnection command until the power supply is actually disconnected. If the timing of the power disconnection commanding can be detected in advance, the power supply should be able to be quickly disconnected after the power disconnection commanding by previously completing the processing such as hibernation or backup data transfer by that timing. At present, however, there is no technique to predict the timing of the power disconnection commanding in advance.

For example, Japanese Patent Application Laid-Open No. 07-028572 describes a structure that predicts power consumption based on the operation history of a robot controller. However, the object predicted by Japanese Patent Application Laid-Open No. 07-028572 is nothing but the power consumption and this document neither discloses nor suggests a technique for predicting the timing of power disconnection commanding.

SUMMARY OF THE INVENTION

The object of the present invention is to provide a control device capable of reducing the time required for power disconnection processing by predicting the timing of power disconnection by a user and previously carrying out data saving processing and the like before the predicted timing, in order to solve these problems.

A control device according to one embodiment of the present invention is a control device which predicts the timing of disconnection of a power supply and comprises a machine learning device configured to learn the disconnection timing of the power supply. The machine learning device comprises a state observation unit configured to observe an operation content for the control device for each user as one of state variables representative of a present state of an environment, a determination data acquisition unit configured to acquire determination data which indicates that power disconnection of the control device is commanded by the user, and a learning unit configured to learn the operation content for each user and a command for the power disconnection in association with each other by using the state variable and the determination data.

In the control device according to the one embodiment of the present invention, the state variables include the date, day of the week, and time of the day of the operation, the acceleration or position of a teaching pendant, the power consumption of a factory, the load state of a CPU, and/or the output state of an alarm, in addition to the operation content for each user.

In the control device according to the one embodiment of the present invention, the learning unit calculates the state variables and the determination data in a multi-layer structure.

The control device according to the one embodiment of the present invention comprises a determination output unit configured to notify the predicted disconnection timing of the power supply.

In the control device according to the one embodiment of the present invention, the learning unit performs the learning using the state variables and the determination data obtained from a plurality of the control devices.

In the control device according to the one embodiment of the present invention, the machine learning device is present in a cloud server.

A machine learning device according to one embodiment of the present invention is a machine learning device configured to learn the timing of disconnection of a power supply and comprises a state observation unit configured to observe an operation content for a control device for each user as one of state variables representative of a present state of an environment, a determination data acquisition unit configured to acquire determination data which indicates that power disconnection of the control device is commanded by the user, and a learning unit configured to learn the operation content for each user and a command for the power disconnection in association with each other by using the state variable and the determination data.

According to the present invention, there can be provided a control device capable of reducing the time required for power disconnection processing by predicting the timing of power disconnection by a user and previously carrying out data saving processing and the like before the predicted timing.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Embodiments of the present invention will be described with reference to the accompanying drawings.

A control device 100 according to a first embodiment of the present invention collects information on tasks performed by a user before power disconnection and the timing of issuance of a command for the power disconnection by the user and performs processing for modeling the relationship between these two pieces of information based on machine learning (learning process). Moreover, using a model created in the learning process, the control device 100 observes the tasks performed by the user and performs processing for predicting the expected timing of issuance of the command for the power disconnection by the user (prediction process).

Figure 1:
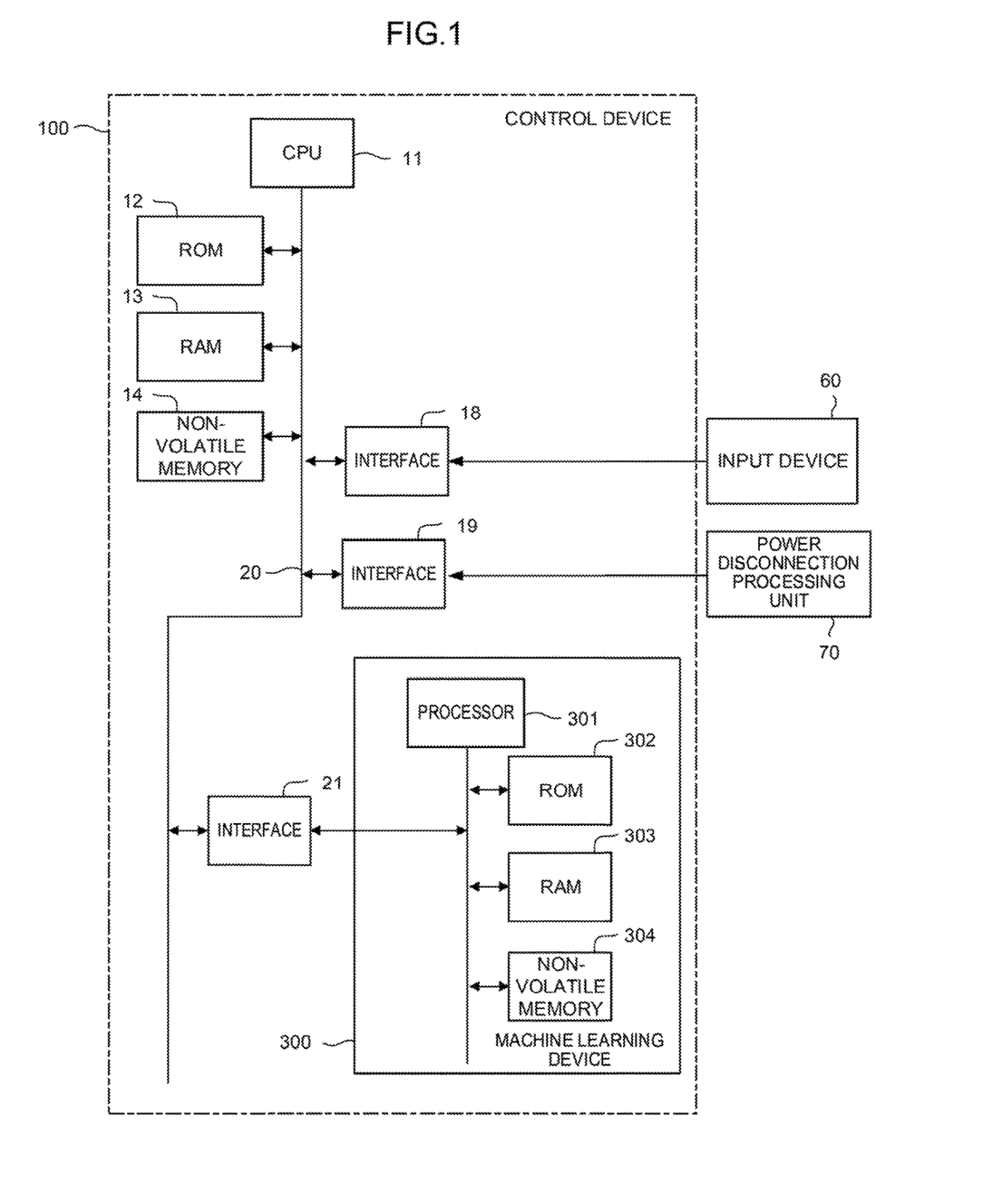
FIG. 1 is a block diagram showing a configuration of a control device.

FIG. 1 is a schematic hardware configuration diagram showing principal parts of the control device 100. A CPU 11 is a processor for generally controlling the control device 100. The CPU 11 reads out a system program stored in a RAM 12 and controls the entire control device 100 according to this system program. A RAM 13 is temporarily stored with temporary calculation data and display data, various externally input data, and the like.

A non-volatile memory 14 is constructed as a memory that is, for example, backed up by a battery (not shown) so that its storage state can be maintained even when the control device 100 is turned off. The non-volatile memory 14 is stored with various programs and data input through an interface (not shown). The programs and the data stored in the non-volatile memory 14 may be expanded in the RAM 13 at the time of execution or use. Moreover, various system programs are previously written in the ROM 12.

An input device 60 is a device for collecting the contents of operations performed by the user. The input device 60 is, for example, a teaching pendant (TP), which collects and outputs information (e.g., user ID) for identifying a logged-in user and information such as logs (e.g., dates, days of the week, and times of the day of execution and working contents) of the operations performed by the user, acceleration of the TP, and the like. Moreover, the input device 60 is a control system of a factory and may be configured to acquire and output the power consumption of the factory. Furthermore, the input device 60 is a vision sensor for tracking the TP and may be configured to acquire and output the current position (coordinates) of the TP. Moreover, the input device 60 is the control device 100 itself and may be configured to acquire and output the load state of the CPU 11 and an output log of an alarm for notifying the necessity of restart.

The information for identifying the user is useful as input data because the timing of issuance of the command for the power disconnection varies depending on the user. Moreover, logs for a task that highly probably places a high load on the CPU, a task such as robot setting that requires restart of the control device 100, and other tasks that involve the output of the alarm to urge restart, among the user's working contents, are useful as input data, since they may possibly be related to the power disconnection effected thereafter.

Furthermore, depending on the user, the pattern of a specific button operation, for example, may be related to the power disconnection without regard to the above tasks, so that all operation logs may possibly be useful as input data. Information on the dates, days of the week, and times of the day is useful as input data because the power disconnection may highly possibly be performed on holidays, before long-term holidays, before break times, and before work end times, for example. Information on the acceleration or position of the TP is useful as input data because places for the TP may be made into a rule in association with the power disconnection in some factories or related to the power disconnection due to the user's habit. The high-load state of the CPU 11 and the output of the alarm for notifying the necessity of restart are also useful because they are sometimes related to the power disconnection in the near future as described above.

The input device 60 samples, in a predetermined cycle (typically in seconds, suitably adjustable as required), those (acceleration, power consumption, coordinates, load state, etc.) of the input data which can be sampled and transmits the sampled data to the control device 100. The input device 60 transmits the other input data (events such as operation logs and alarm generation logs) to the control device 100 each time an event occurs. The control device 100 receives the input data from the input device 60 through an interface 18 and delivers them to the CPU 11.

When the power disconnection is commanded by the user, a power disconnection processing unit 70 detects this and outputs a notification signal (hereinafter referred to as disconnection information). The control device 100 receives the disconnection information from the power disconnection processing unit 70 through an interface 19 and delivers it to the CPU 11.

An interface 21 is an interface for connecting the control device 100 and a machine learning device 300. The machine learning device 300 comprises a processor 301 for controlling the entire machine learning device 300, a ROM 302 stored with system programs and the like, a RAM 303 for temporary storage in each step of processing related to machine learning, and a non-volatile memory 304 used to store a learning model and the like. The machine learning device 300 can observe various pieces of information (input data, disconnection information, etc.) that can be acquired by the control device 100 through the interface 21.

Figure 2:
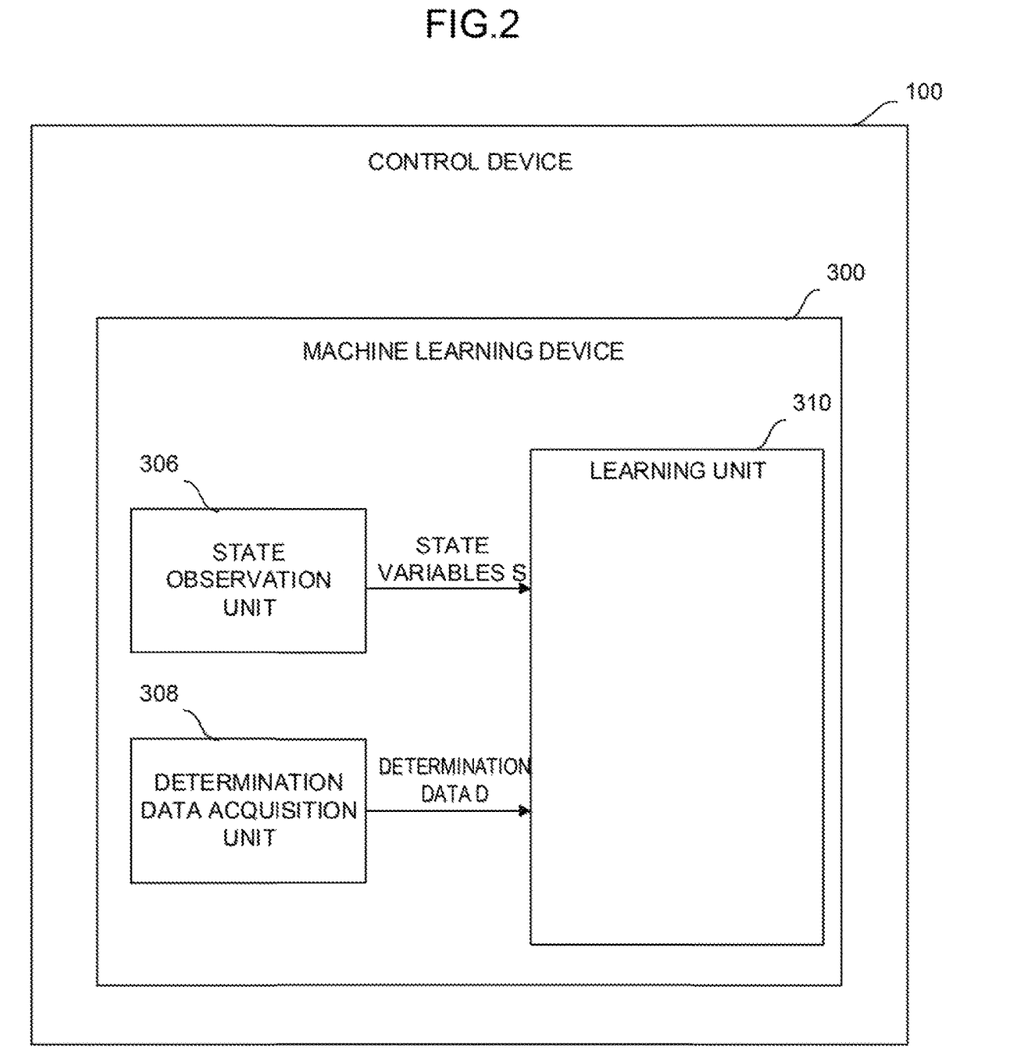
FIG. 2 is a block diagram showing a configuration of the control device.

FIG. 2 is a schematic functional block diagram of the control device 100 and the machine learning device 300. The machine learning device 300 comprises software (learning algorithm, etc.) and hardware (processor 301, etc.) for self-learning based on the so-called machine learning of the correlation between the change of the input data and the disconnection information. An object learned by the machine learning device 300 of the control device 100 is equivalent to a model structure representative of the correlation between the change of the input data and the disconnection information.

As indicated by functional blocks in FIG. 2, the machine learning device 300 of the control device 100 comprises a state observation unit 306 configured to observe time-series input data as state variables S representative of the present states of the environments, a determination data acquisition unit 308 configured to acquire the disconnection information as determination data D, and a learning unit 310 configured to learn the change of the input data and the disconnection information in association with each other using the state variables S and the determination data D.

The state observation unit 306 can be constructed, for example, as a function of the processor 301. Alternatively, the state observation unit 306 can be constructed, for example, as software stored in the ROM 302 and configured to make the processor 301 function. The state variables S or the time-series input data observed by the state observation unit 306 can be acquired as those output from the input device 60. The input device 60 extracts time-series input data for a predetermined period from time-series input data acquired in a predetermined sampling cycle and outputs the extracted data as the state variables S to the state observation unit 306.

For example, the input device 60 continually acquires the input data and saves the input data during a predetermined fixed period (e.g., past x minutes before the time of acquisition of the latest input data). The input device 60 detects that the disconnection information is output by the power disconnection processing unit 70 and outputs the time-series input data for a predetermined fixed period (e.g., past n minutes before the time m minutes before the output of the disconnection information) earlier than the point in time of the output of the disconnection information, as the state variables S. Typically, m can be set longer than or equal to an average time required for processing such as hibernation or backup data transfer. The lengths and units of m and n can be set arbitrarily. Moreover, m and n can be made changeable by the user, if necessary.

The determination data acquisition unit 308 can be constructed, for example, as a function of the processor 301. Alternatively, the determination data acquisition unit 308 can be constructed, for example, as software stored in the ROM 302 and configured to make the processor 301 function. The determination data D or the disconnection information acquired by the determination data acquisition unit 308 can be acquired as those output from the power disconnection processing unit 70.

The learning unit 310 can be constructed, for example, as a function of the processor 301. Alternatively, the learning unit 310 can be constructed, for example, as software stored in the ROM 302 and configured to make the processor 301 function. The learning unit 310 learns the correlation between the change of the input data and the disconnection information according to an arbitrary learning algorithm collectively called the machine learning. The learning unit 310 can repeatedly perform learning based on a data set including the above state variables S and the determination data D.

By repeating these learning cycles, the learning unit 310 can automatically identify characteristics suggestive of the correlation between the change of the input data and the disconnection information. Although the correlation between the change of the input data and the disconnection information is practically unknown at the start of the learning algorithm, the learning unit 310 interprets the correlation by gradually identifying the characteristics with the progress of the learning. If the correlation between the change of the input data and the disconnection information is interpreted to some reliable level, the learning results repeatedly output by the learning unit 310 can be used to estimate a desirable form of the disconnection information based on the present state (changing trend of the input data). Thus, the learning unit 310 can gradually approximate the correlation between the change of the input data and the disconnection information to an optimal solution with the progress of the learning algorithm.

As described above, the machine learning device 300 of the control device 100 is configured so that the learning unit 310 learns the disconnection information according to the machine learning algorithm, using the state variables S observed by the state observation unit 306 and the determination data D acquired by the determination data acquisition unit 308. The state variables S are composed of data that are not easily influenced by disturbances, while the label data L are obtained uniquely. Thus, according to the machine learning device 300 of the control device 100, the disconnection information corresponding to the change of the input data can be obtained automatically and accurately, without performing calculations or estimation, by using the results of learning by the learning unit 310.

Figure 3:
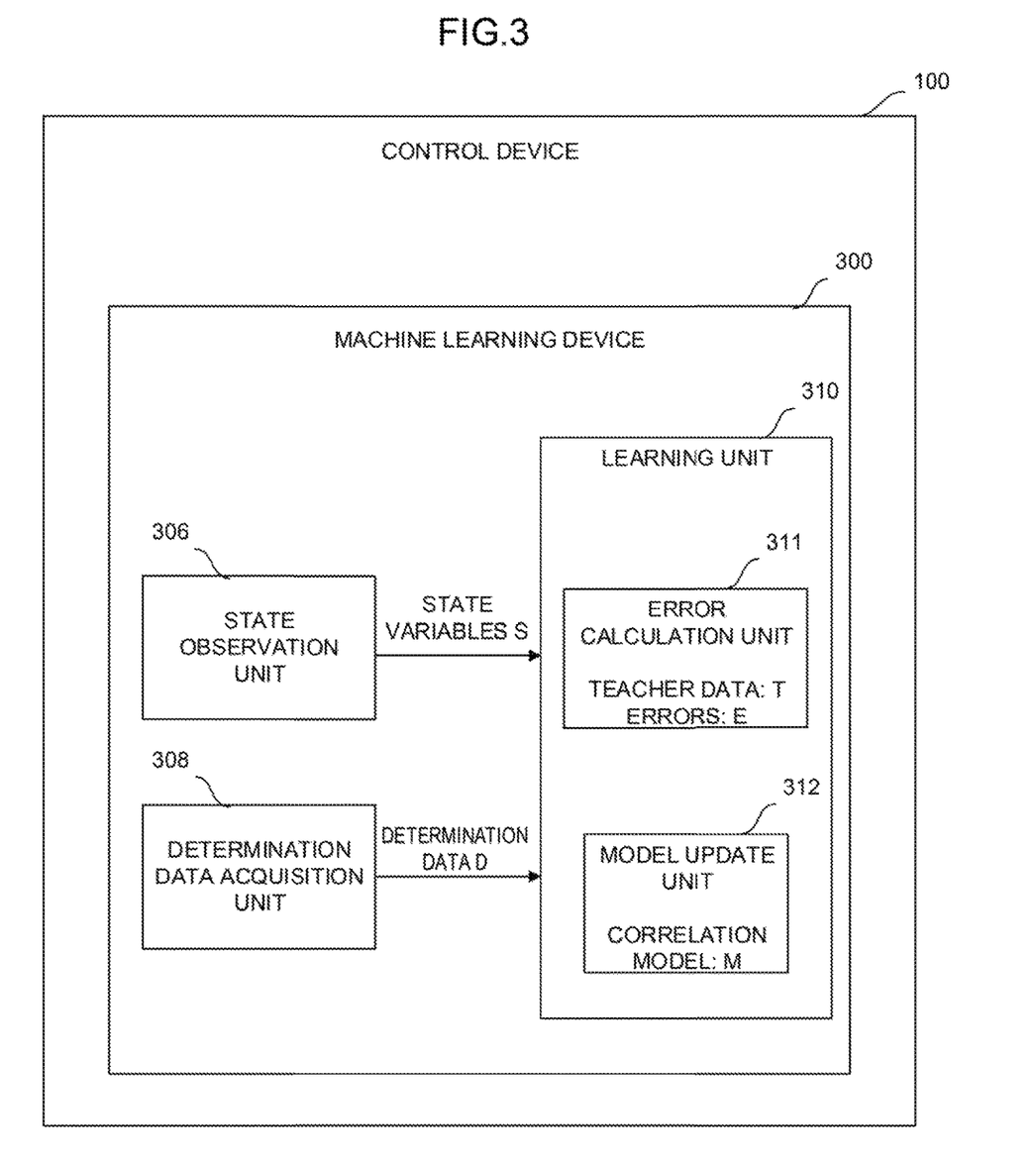
FIG. 3 is a block diagram showing a configuration of the control device.

In the machine learning device 300 having the above configuration, the learning algorithm executed by the learning unit 310 is not particularly limited and a conventional learning algorithm can be used as the machine learning. FIG. 3 shows a configuration based on a form of the control device 100 shown in FIG. 2, in which the learning unit 310 performs supervised learning as an example of the learning algorithm. The supervised learning is a method in which a large volume of known data sets (called teacher data) including inputs and outputs corresponding thereto are given in advance, and characteristics suggestive of the correlations between the inputs and the outputs are identified from these teacher data, whereby a correlation model for estimating an output (disconnection information corresponding to the change of the input data) required for a new input is learned.

In the machine learning device 300 of the control device 100 shown in FIG. 3, the learning unit 310 comprises an error calculation unit 311 and a model update unit 312. The error calculation unit 311 calculates errors E between a correlation model M that derives the disconnection information from the state variables S and correlation characteristics identified from teacher data T prepared in advance. The model update unit 312 updates the correlation model M so as to reduce the errors E. The learning unit 310 learns the correlation between the change of the input data and the disconnection information as the model update unit 312 repeats the update of the correlation model M.

The correlation model M can be constructed by regression analysis, reinforcement learning, deep learning or the like. An initial value of the correlation model M is given, for example, as a simplified representation of the correlations between the state variables S and shape data, to the learning unit 310 before the start of the supervised learning. For example, the teacher data T can be composed of experience values (known data sets including the change of the input data and the disconnection information) stored as the correspondence between the past change of the input data and disconnection information is recorded, and are given to the learning unit 310 before the start of the supervised learning. The error calculation unit 311 identifies the correlation characteristics suggestive of the correlation between the change of the input data and the disconnection information from the large volume of teacher data T given to the learning unit 310, and obtains the errors E between the correlation characteristics and the correlation model M corresponding to the state variables S in the present states. The model update unit 312 updates the correlation model M so as to reduce the errors E according to a predetermined update rule, for example.

In the next learning cycle, the error calculation unit 311 obtains the errors E with respect to the correlation model M corresponding to newly obtained state variables S and determination data D, using these state variables S and determination data D, and the model update unit 312 updates the correlation model M again. In this way, the correlation between the present state (change of the input data) of the environment having so far been unknown and the state (disconnection information) corresponding thereto gradually becomes clear. In other words, the relationship between the change of the input data and the disconnection information is gradually approximated to an optimal solution by updating the correlation model M.

Figure 4A:
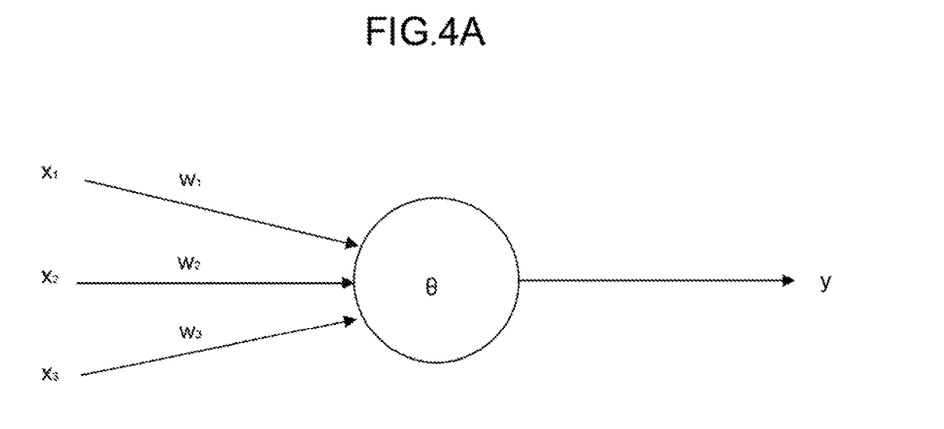
FIG. 4A is a diagram illustrating a neuron.
Figure 4B:
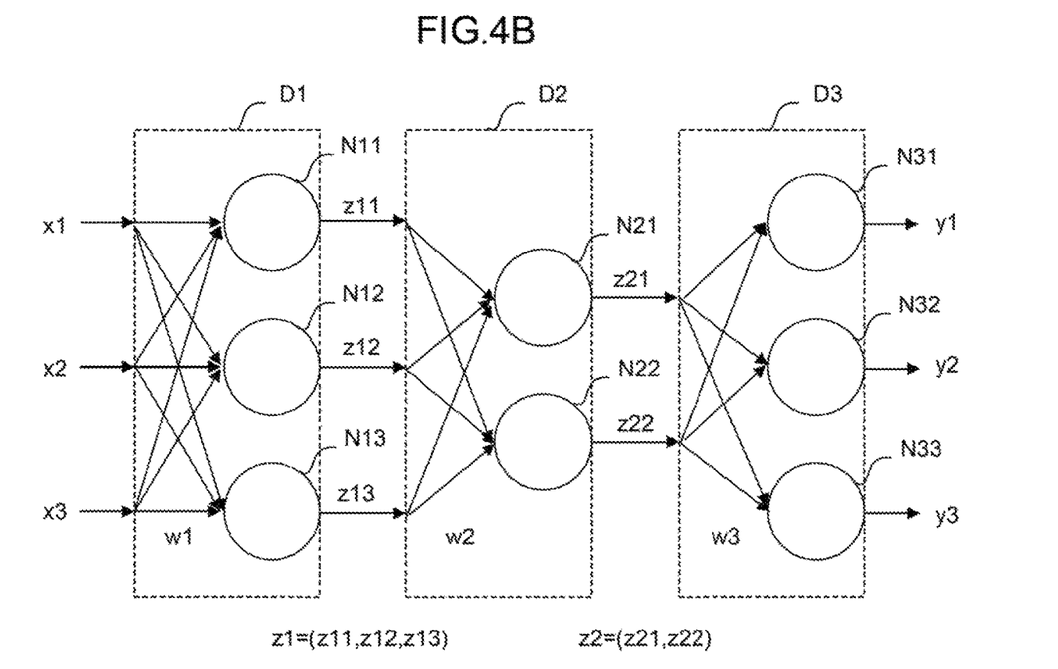
FIG. 4B is a diagram illustrating a neural network.

For example, a neural network can be used to advance the above supervised learning. FIG. 4A schematically shows a model of a neuron. FIG. 4B schematically shows a model of a three-layer neural network constructed by combining the neurons shown in FIG. 4A. The neural network can be composed of, for example, an arithmetic unit or a storage device imitating the neuron model.

The neuron shown in FIG. 4A outputs results y from a plurality of inputs x (e.g., inputs $x_1$ to $x_3$). The inputs $x_1$ to $x_3$ are multiplied by their corresponding weights w ($w_1$ to $w_3$). Thus, the neuron delivers the outputs y represented by Equation 1 below. In Equation 1, the inputs x, outputs y, and weights w are all vectors. Moreover, θ is a bias and $f_k$ is an activation function.

$$y = f_k(\Sigma^n_{i=1} x_i w_i - \theta)$$

In the three-layer neural network shown in FIG. 4B, a plurality of inputs x (e.g., inputs x1 to x3) are input from the left side and results y (e.g., results y1 to y3) are output from the right side. In the illustrated example, the individual inputs x1, x2 and x3 are multiplied by their corresponding weights (collectively represented by w1) and each of them is input to three neurons N11, N12 and N13.

In FIG. 4B, the respective outputs of the neurons N11 to N13 are collectively represented by z1. The outputs z1 can be regarded as feature vectors based on the extraction of the feature quantity of input vectors. In the illustrated example, the individual feature vectors z1 are multiplied by their corresponding weights (collectively represented by w2) and each of them is input to two neurons N21 and N22. The feature vectors z1 represent features between the weights w1 and w2.

In FIG. 4B, the respective outputs of the neurons N21 and N22 are collectively represented by z2. The outputs z2 can be regarded as feature vectors based on the extraction of the feature quantity of the feature vectors z1. In the illustrated example, the individual feature vectors z2 are multiplied by their corresponding weights (collectively represented by w3) and each of them is input to three neurons N31, N32 and N33. The feature vectors z2 represent features between the weights w2 and w3. Finally, the neurons N31 to N33 output the results y1 to y3, respectively.

In the machine learning device 300 of the control device 100, the disconnection information can be output as estimated values (results y) as the learning unit 310 performs a calculation of a multi-layer structure based on the above neural network with the state variables S used as the inputs x. Operation modes of the neural network include a learning mode and a determination mode. For example, the weights w can be learned using a learning data set in the learning mode, while the timing of disconnection can be estimated in the determination mode using the learned weights w. Detection, classification, inference and the like can also be performed in the determination mode.

The above configurations of the control device 100 and the machine learning device 300 can be described as a machine learning method (or software) performed by the CPU 11 or the processor 301. This machine learning method is a method for learning the disconnection information corresponding to the change of the input data and comprises a step in which the CPU 11 or the processor 301 observes the change of the input data as the state variables S representative of the present states of the environments, a step of acquiring the disconnection information as the determination data D, and a step of learning the change of the input data and the disconnection information in association with each other using the state variables S and the determination data D.

According to the present embodiment, the machine learning device 300 generates a model indicative of the correlation between the change of the input data and the disconnection information. Thus, once the learning model is created, the disconnection information can be predicted based on the change of the input data having been able to be acquired so far, even in the middle of machining.

Figure 5:
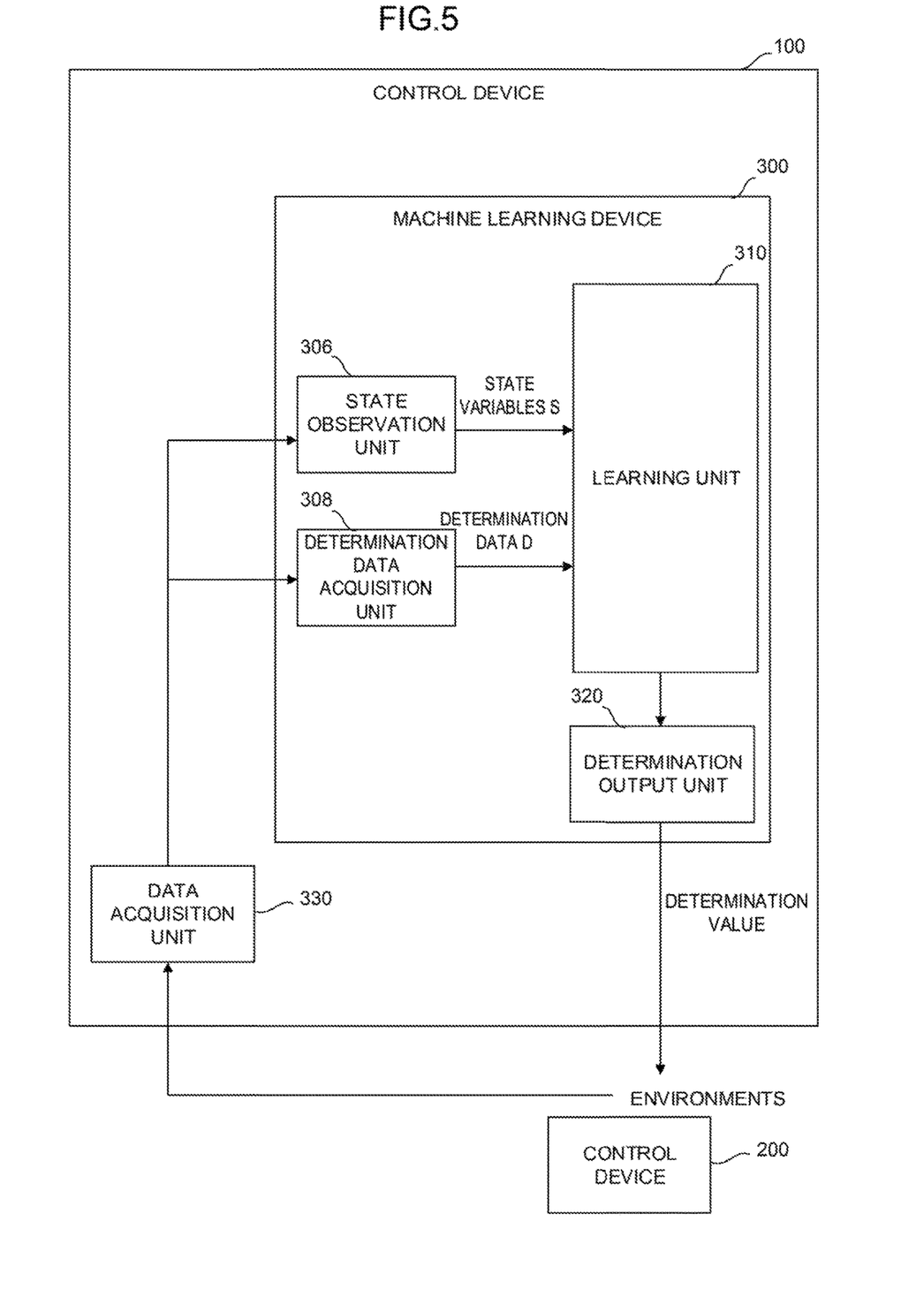
FIG. 5 is a block diagram showing a configuration of the control device.

FIG. 5 shows a control device 100 according to a second embodiment. The control device 100 comprises a machine learning device 300 and a data acquisition unit 330. The data acquisition unit 330 acquires time-series input data and disconnection information from an input device 60 and a power disconnection processing unit 70.

The machine learning device 300 of the control device 100 comprises a determination output unit 320 configured to output the disconnection information estimated by the learning unit 310 based on the change of the input data to a control device 200, in addition to the constituent elements of the machine learning device 300 of the first embodiment.

The determination output unit 320 can be constructed, for example, as a function of a processor 301. Alternatively, the determination output unit 320 can be constructed, for example, as software configured to make the processor 301 function. The determination output unit 320 outputs the disconnection information estimated by the learning unit 310 based on the change of the input data to the control device 200.

The machine learning device 300 of the control device 100 with the above configuration has an effect equivalent to that of the foregoing machine learning device 300. In particular, the machine learning device 300 of the second embodiment can change the states of the environments by the output of the determination output unit 320. In the machine learning device 300 of the first embodiment, on the other hand, an external device can be expected of a function equivalent to the determination output unit 320 for reflecting the results of learning by the learning unit 310 on the environments.

Figure 6:
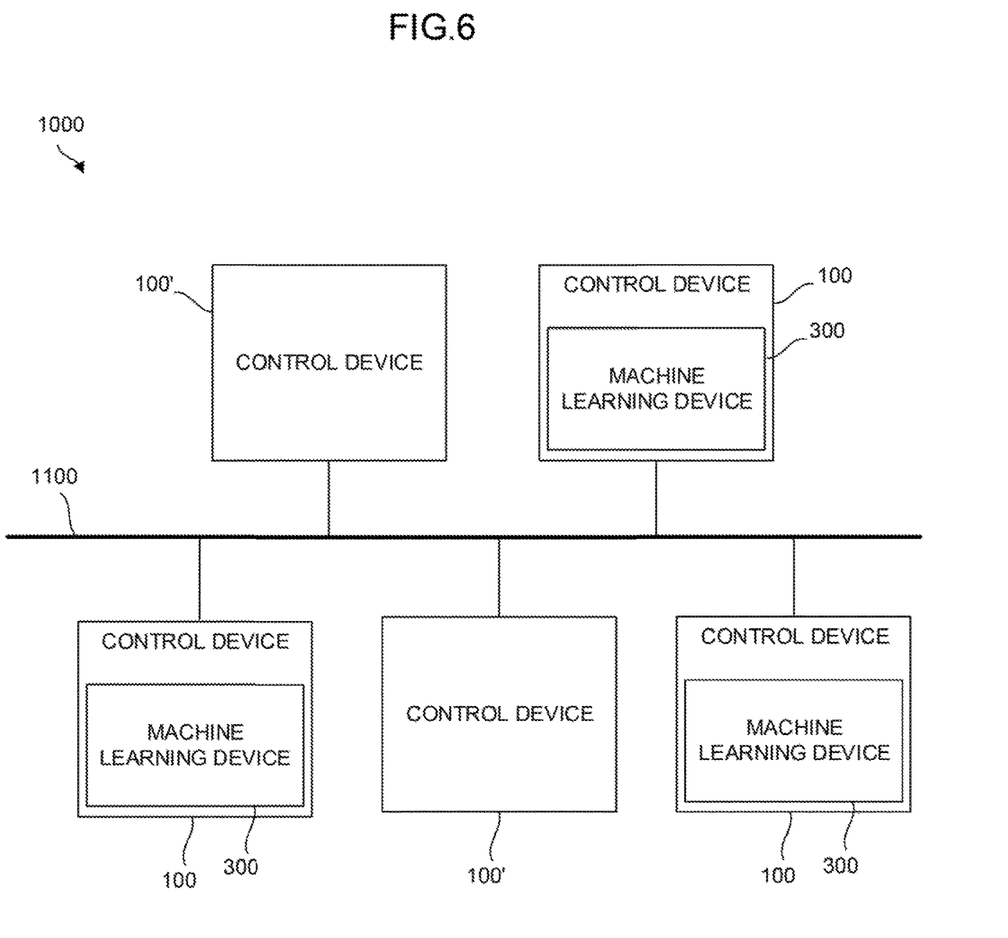
FIG. 6 is a block diagram showing a configuration of a control system.

FIG. 6 shows another embodiment of the present invention. A control system 1,000 comprises control devices 100 and 100' of the same type and a wired/wireless network 1,100 that connects the control devices 100 and 100' to one another. The control devices 100 and 100' have necessary mechanisms for tasks for the same purpose. While the control device 100 comprises a machine learning device 300, however, the control device 100' does not.

In the control system 1,000 having the above configuration, the control device 100 with the machine learning device 300, out of the plurality of control devices 100 and 100', can automatically and accurately obtain disconnection information corresponding to input data, without performing calculations or estimation, by using the results of learning by a learning unit 310. Moreover, the machine learning device 300 of at least one control device 100 can be constructed so as to learn the correlations between input data and disconnection information common to all the control devices 100 and 100', based on state variables S and determination data D obtained individually for the other plurality of control devices 100 and 100', and that the results of the learning are shared in common by all the control devices 100 and 100'. Thus, according to the control system 1,000, the speed and reliability of the learning of the disconnection information corresponding to the input data can be improved by using more diverse data sets (including the state variables S and the determination data D).

Practical Example 1

Figure 8:
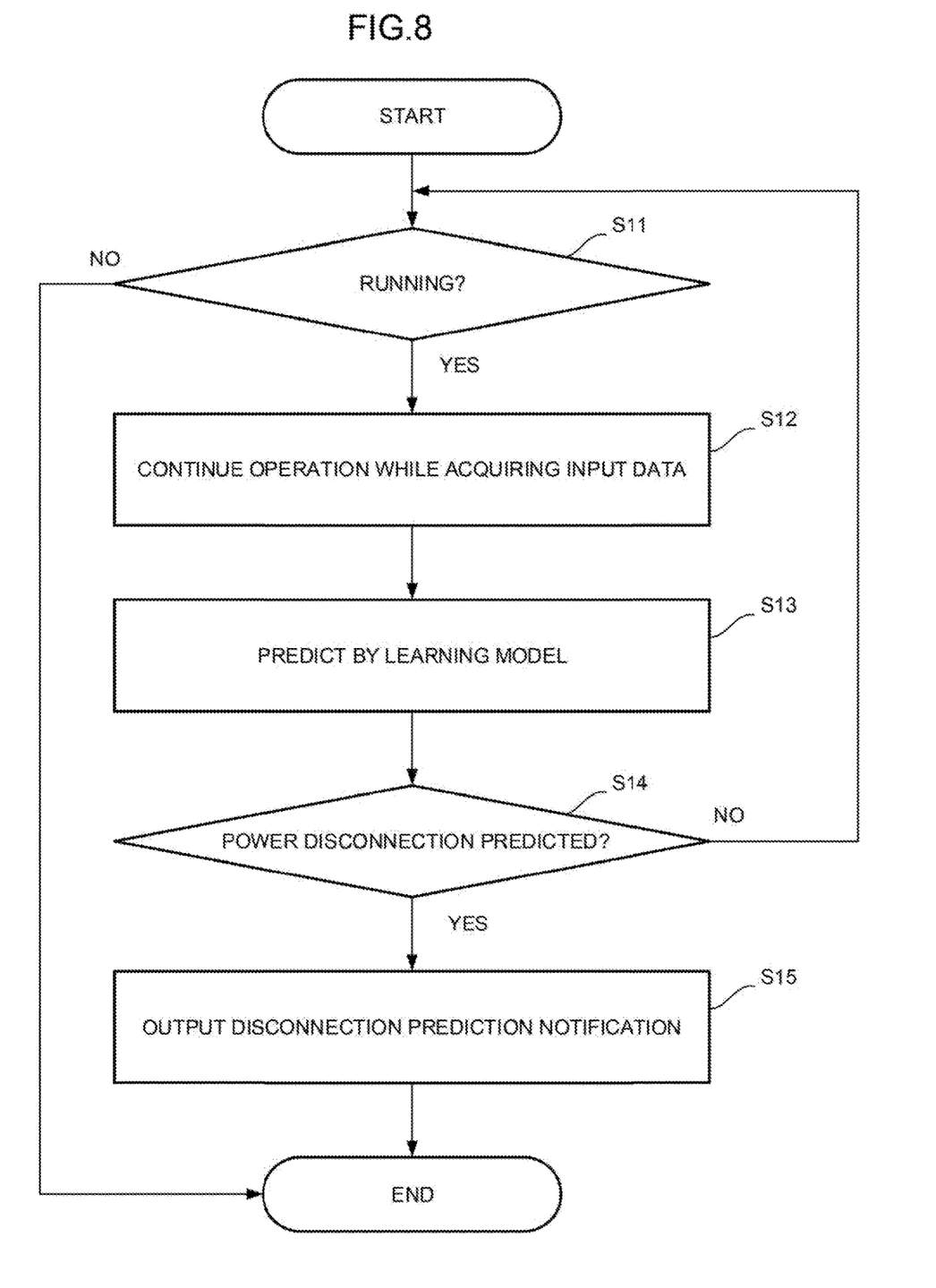
FIG. 8 is a flowchart showing the operation of the control device.
Figure 9:
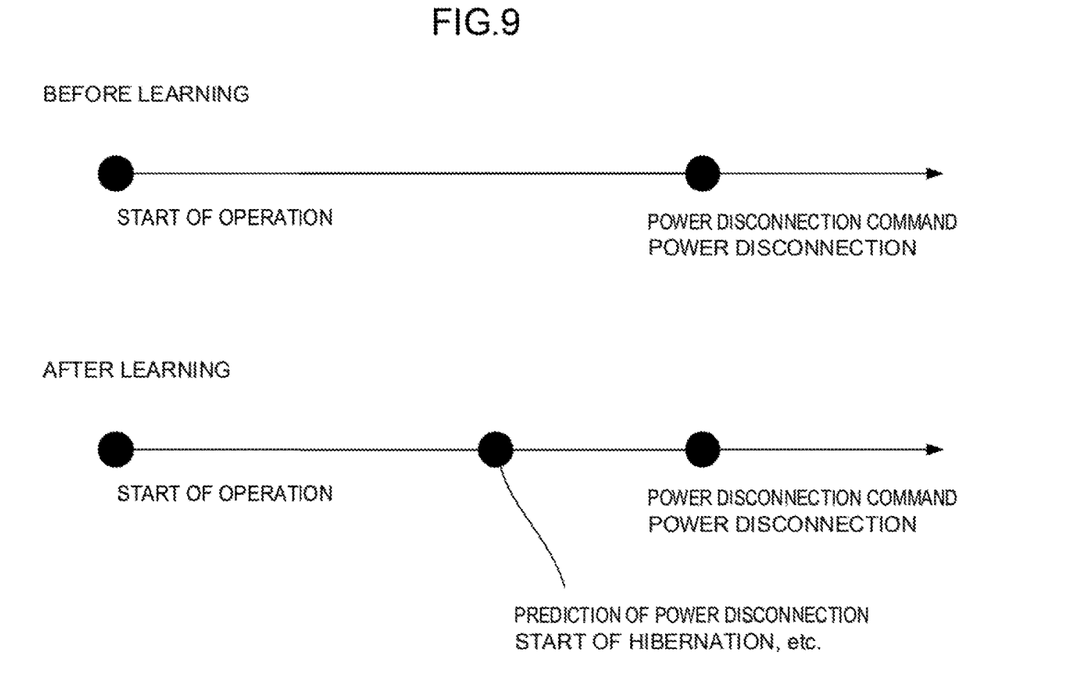
FIG. 9 is a diagram showing the operation of a control device according to Practical Example 1.

Practical Example 1 of the control device 100 will be described with reference to FIGS. 7 to 9.

An outline of Practical Example 1 will be described with reference to FIG. 9. The control device 100 before learning is turned off immediately when the power disconnection is commanded by the user. Usually, the processing such as hibernation or backup data transfer is started after the power disconnection is commanded. Since the power supply is immediately disconnected in the present embodiment, however, the processing such as hibernation or backup data transfer cannot be completed normally. Therefore, a relatively long start-up time is required at the next starting time. After learning, the control device 100 is also turned off immediately when the power disconnection is commanded by the user. By the time the power disconnection is commanded by the user, however, the processing such as hibernation or backup data transfer will have already been completed, so that only a relatively short start-up time is required at the next starting time.

The control device 100 before learning creates a learning model (learning process) by learning the correlation between the change of the input data and the disconnection information, triggered by the user's command for the power disconnection. The control device 100 after learning continually predicts the occurrence of power disconnection (prediction process) during the operation using the created learning model. If the power disconnection is predicted, the control device 100 outputs a disconnection prediction notification. In response to the disconnection prediction notification, the control device 100 can immediately start the processing such as hibernation or backup data transfer and the like. Thereafter, if the power disconnection is commanded by the user as predicted, the control device 100 can immediately disconnect the power supply, since the processing such as hibernation or backup data transfer has already been completed.

Referring to the flowchart of FIG. 7, the operation of the control device 100 in the learning process will be described specifically.

S1: The control device 100 starts the operation. Normally, the control device 100 starts collecting the input data from the input device 60 the moment the operation is started. The control device 100 acquires the input data in the predetermined sampling cycle and continues to accumulate them in the storage device. A ring buffer or the like is used as the storage unit and those of the accumulated input data which have lasted for a certain time (e.g., input data acquired x minutes or more before the time of acquisition of the latest input data) can also be deleted. In this way, a storage area can be used effectively.

S2: The power disconnection processing unit 70 detects that the power disconnection of the control device 100 is commanded by the user. On receiving the disconnection information, the control device 100 starts a learning cycle triggered by the reception.

S3: The control device 100 inputs, to the machine learning device 300, input data for a predetermined fixed period (e.g., past n minutes before the time m minutes before the output of the disconnection information (m+n≤x)) out of the time-series input data accumulated in Step S1, as the state variables S, and the disconnection information acquired in Step S2, as the determination data D, thereby creating a learning model indicative of the correlation between the state variables S and the determination data D.

The control device 100 repeats the processing of Steps S1 to S2 so that sufficient numbers of state variables S and determination data D for the learning model of a desired precision are obtained. In this learning process, one learning cycle (processing of Steps S1 to S3) is performed each time the disconnection information is issued.

In the present practical example, the power supply to the control device 100 is disconnected immediately after the generation of the power disconnection command. Therefore, the control device 100 can save the input data and the disconnection information into the non-volatile storage device in Steps S1 and S2. At the next starting time, the control device 100 first performs the learning processing of Step S3 and then returns to the processing of Step S1.

However, if the control device 100 and the machine learning device 300 are separated and if the machine learning device 300 is disposed in, for example, a cloud, fog, or edge computing environment, the machine learning device 300 can continue to perform learning even when the power supply to the control device 100 is disconnected.

Referring then to the flowchart of FIG. 8, the operation of the control device 100 in the prediction process will be described.

S11: The control device 100 starts the operation. Normally, the control device 100 starts collecting the input data from the input device 60 the moment the operation is started. Thereafter, the following processing is performed continuously until the power supply to the control device 100 is disconnected.

S12: The control device 100 starts collecting the input data from the input device 60 the moment the operation is started. The control device 100 continues to acquire and accumulate the input data in the predetermined sampling cycle. Those of the accumulated input data which have lasted for a certain time (input data acquired at least n minutes or more before the time of acquisition of the latest input data) can also be deleted. In this way, the storage area can be used effectively.

S13: The control device 100 inputs, to the machine learning device 300, input data for a predetermined fixed period inputs, to the machine learning device 300, input data for a predetermined fixed period (e.g., n minutes) out of the time-series input data acquired in Step S12, as the state variables S. The machine learning device 300 inputs the state variables S to a pre-trained model and outputs determination data D corresponding to the state variables S as predicted values. The control device 100 may be configured to also output the time before the generation of the power disconnection command. If the input data for past n minutes before the time m minutes before the output of the disconnection information are used as the state variables S in the learning process and if the input data for n minutes are used as the state variables S in the prediction process, for example, it can be predicted that the power disconnection command will be generated in m minutes.

S14: If the disconnection information is not output as a predicted value, the processing returns to Step S11 and the operation is continued. If the disconnection information is output as the predicted value, the processing proceeds to S15.

S15: The control device 100 outputs a notification (disconnection prediction information) indicative of the prediction of the power disconnection.

On receiving this disconnection prediction information, the control device 100 can start the processing such as hibernation or backup data transfer and the like. In this way, the power supply can be disconnected immediately when the power disconnection is commanded by the user. Since the specific contents of the processing (hibernation or backup data transfer) after the disconnection prediction information is received by the control device 100 are not contained in the present invention, a detailed description thereof is omitted herein.

Practical Example 2

Figure 10:
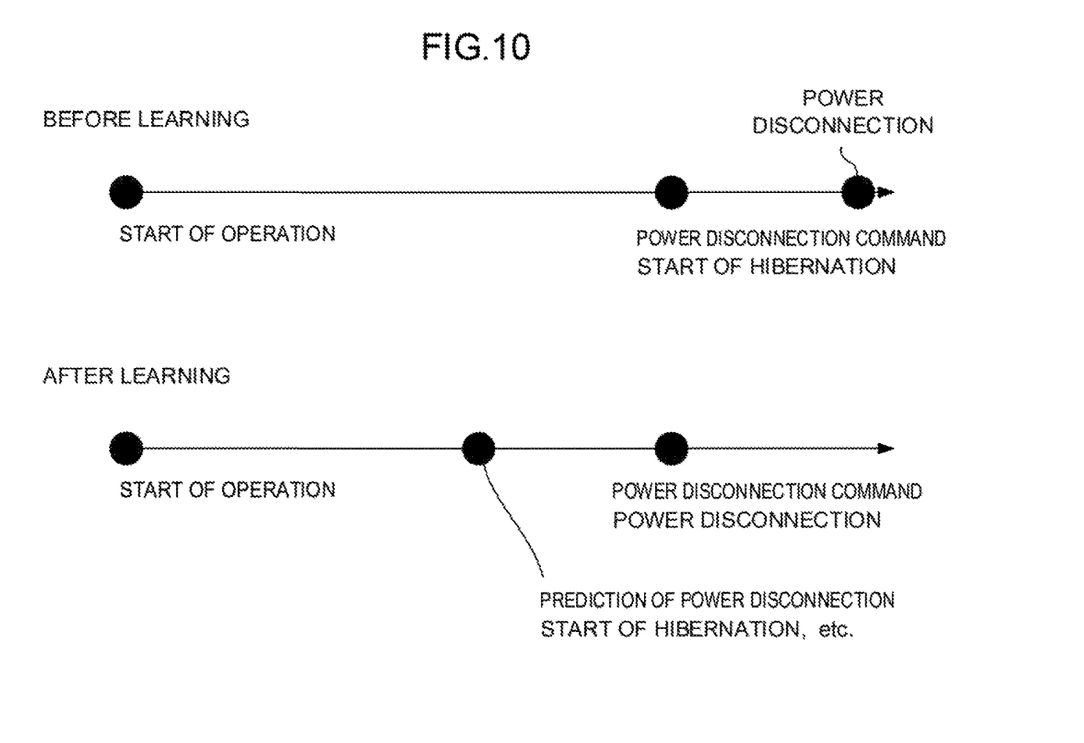
FIG. 10 is a diagram showing the operation of a control device according to Practical Example 2.

Practical Example 2 of the control device 100 will be described with reference to FIGS. 7, 8 and 10. Differences from Practical Example 1 are mainly described here. Items not specifically mentioned are assumed to be operated in the same manner as in Practical Example 1.

An outline of Practical Example 2 will be described with reference to FIG. 10. If the power disconnection is commanded by the user, the control device 100 performs the processing such as hibernation or backup data transfer and is turned off after completion. Therefore, the power disconnection requires a relatively long time. On the other hand, the control device 100 after learning is turned off immediately when the power disconnection is commanded by the user. This is done because the processing such as hibernation or backup data transfer will have already been completed by this time.

Figure 7:
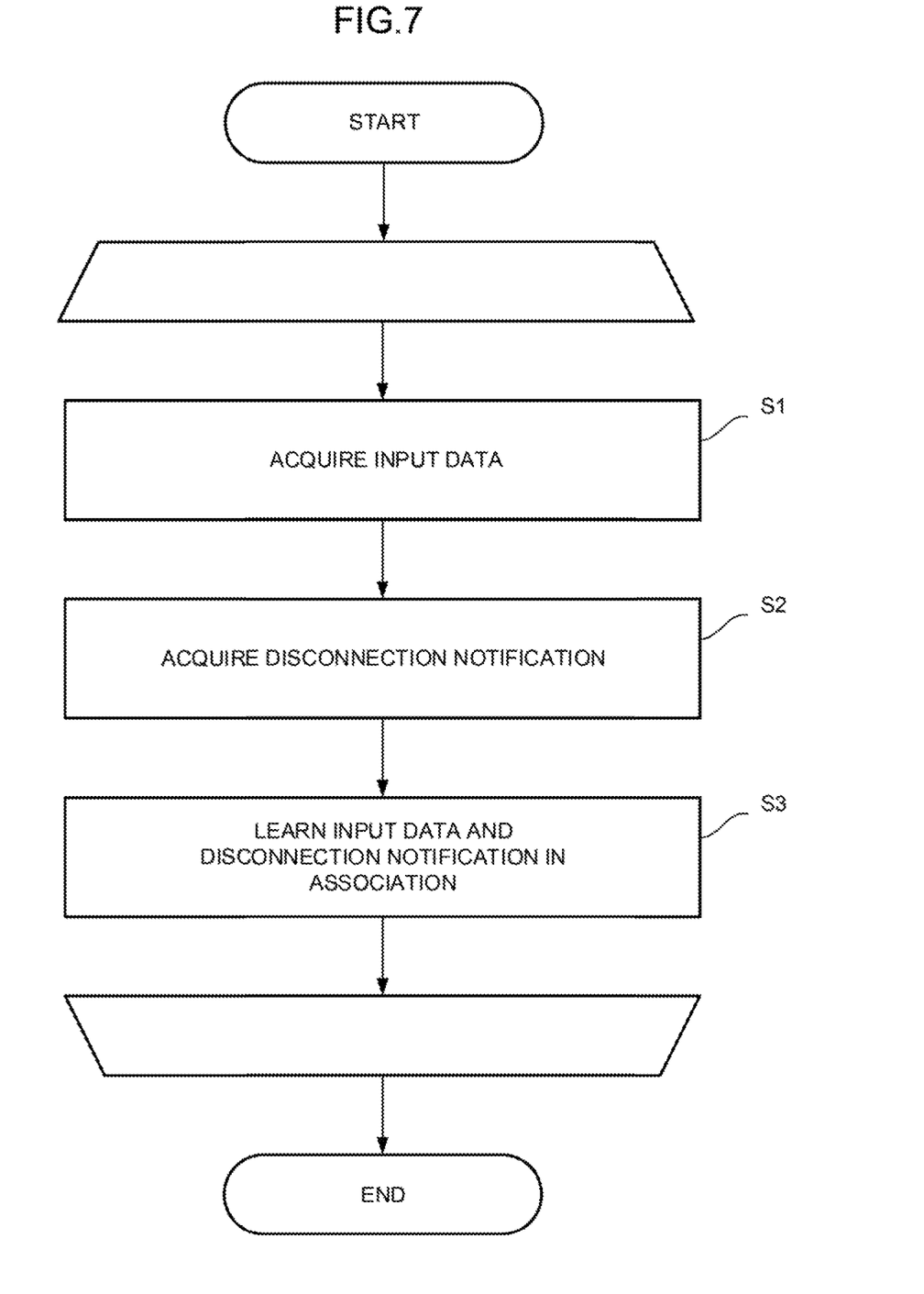
FIG. 7 is a flowchart showing the operation of the control device.

In the learning process of the control device 100 shown in the flowchart of FIG. 7, the power supply to the control device 100 is disconnected in a considerable period of time after the generation of the power disconnection command, in the present practical example. Therefore, the control device 100 can perform the learning process of Step S3 immediately after the generation of the power disconnection command. If there is a possibility of the learning process failing to be completed before the power disconnection, the control device 100 may be urged to perform the learning process at the next starting time, or the machine learning device 300 disposed in the cloud, fog, or edge computing environment may be made to continue to perform learning, as in Practical Example 1. Since the prediction process of the flowchart of FIG. 8 is identical to that of Practical Example 1, a detailed description thereof is omitted herein.

In these two practical examples, the machine learning device 300 of the control device 100 generates the learning model that has learned the correlation between the change of the input data and the disconnection information during the operation of the control device 100. By using this learning model, the control device 100 can predict the disconnection information based on the change of the input data and notify the results of the prediction to the control device 200.

While embodiments of the present invention have been described above, the invention is not limited to the above-described embodiments and may be suitably modified and embodied in various forms.

For example, in the embodiments described and illustrated above, the control device 100 mainly comprises the machine learning device 300. However, the present invention is not limited to this arrangement, and the machine learning device 300 may be provided outside the control device 100. For example, the machine learning device 300 may be constructed as an independent information processing apparatus disposed in the cloud, fog, or edge computing environment and configured to be able to communicate with the control device 100 in a wired or wireless manner.

The invention claimed is:

1. A control device which predicts the timing of disconnection of a power supply to a machine or robot controlled by the control device, the control device comprising:
    a machine learning device configured to predict a future disconnection timing when a user of the machine or the robot controlled by the control device executes a future command to disconnect the power supply from the control device, the machine learning device including a processor configured to:
        receive input from the user of the machine or the robot controlled by the control device,
        observe state variables representative of a present state of an environment, the state variables including operation content of input received from the user,
        determine when the user executes a present command to disconnect the power supply from the control device,
        analyze the state variables observed before the user executes the present command to determine which operation content of the input from the user correlates with the present command for the power disconnection, and
        predict the future disconnection timing when the user of the machine or the robot controlled by the control device executes the future command to disconnect the power supply from the control device based on the determined operation content and prepare the control device for power disconnection prior to the future disconnection timing.

2. The control device according to claim 1, wherein the state variables include the date, day of the week, time of the day of the operation, the acceleration or position of a teaching pendant, the power consumption of a factory, the load state of a CPU, and/or the output state of an alarm, in addition to the operation content for each user.

3. The control device according to claim 1, wherein the processor is further configured to calculate the state variables and the determination data in a multi-layer structure.

4. The control device according to claim 1, wherein the processor is further configured to notify the predicted disconnection timing of the power supply.

5. The control device according to claim 1, wherein the processor is further configured to perform learning using the state variables and determination data obtained from a plurality of the control devices.

6. The control device according to claim 1, wherein the machine learning device is present in a cloud server.

7. A system for learning the timing of disconnection of a power supply, the system comprising:
    a control device configured to control a machine or a robot; and
    a machine learning device configured to predict a future disconnection timing when a user of the machine or the robot controlled by the control device executes a future command to disconnect the power supply from the control device, the machine learning device including a processor configured to:
        receive input from the user of the machine or the robot controlled by the control device, observe for a user, an operation content input by the user to a control device as one of state variables representative of a present state of an environment, determine when the user executes a present command to disconnect the power supply from the control device, analyze the state variables observed before the user executes the present command to determine which operation content of the input from the user correlates with the present command for the power disconnection, and predict the future disconnection timing when the user of the machine or the robot controlled by the control device executes the future command to disconnect the power supply from the control device based on the determined operation content and prepare the control device for power disconnection prior to the future disconnection timing.

* * * * *